United States Patent
Murugesan et al.

(10) Patent No.: US 11,122,466 B2
(45) Date of Patent: Sep. 14, 2021

(54) METHOD AND APPARATUS FOR PREDICTING SUCCESSFUL DSL LINE OPTIMIZATION

(71) Applicant: ASSIA SPE, LLC, Redwood City, CA (US)

(72) Inventors: Sugumar Murugesan, Foster City, CA (US); Mehdi Mohseni, Menlo Park, CA (US)

(73) Assignee: ASSIA SPE, LLC, Wilmington, DE (US)

(*) Notice: Subject to any disclaimer, the term of this patent is extended or adjusted under 35 U.S.C. 154(b) by 0 days.

(21) Appl. No.: 16/709,620

(22) Filed: Dec. 10, 2019

(65) Prior Publication Data
US 2020/0120542 A1    Apr. 16, 2020

Related U.S. Application Data

(62) Division of application No. 15/532,976, filed as application No. PCT/US2014/068666 on Dec. 4, 2014, now Pat. No. 10,512,000.

(51) Int. Cl.
*H04W 28/08*    (2009.01)
*H04L 12/24*    (2006.01)
(Continued)

(52) U.S. Cl.
CPC ......... *H04W 28/08* (2013.01); *H04L 12/2869* (2013.01); *H04L 12/66* (2013.01);
(Continued)

(58) Field of Classification Search
CPC ............ H04L 12/2869; H04L 41/0213; H04L 41/0823; H04L 43/0882; H04M 3/2209; H04M 3/30; H04W 28/08; H04W 76/10
See application file for complete search history.

(56) References Cited

U.S. PATENT DOCUMENTS 6,091,713 A    7/2000 Lechleider et al.
8,031,761 B2    10/2011 Cioffi et al.
(Continued)

FOREIGN PATENT DOCUMENTS

CN    103647675 B    3/2014
MY    20070913 A    8/2018
(Continued)

OTHER PUBLICATIONS

CN Notice of Granting Patent Right for Invention dated Sep. 14, 2020 in the Chinese Patent Application No. 201480083855.3, (4 pgs).

(Continued)

*Primary Examiner* — Melanie Jagannathan
(74) *Attorney, Agent, or Firm* — North Weber & Baugh LLP; Michael V. North (57) ABSTRACT

A DSL management system predicts achieving improved DSL line performance before a DSL optimizer optimizes performance of the DSL line. The system obtains a current state of performance of the DSL line before optimization and a target state of performance after optimization. The system further obtains a measure of DSL line characteristics and identifies, from records of performance information associated with DSL lines, a subset of records associated with a subset of DSL lines that have a similar measure of the DSL line characteristics as the DSL line for which achieving improved performance is predicted. The system obtains a probability that the DSL optimizer will optimize the performance of the DSL line based on a frequency with which the identified subset of records indicates that the optimizer previously has optimized the performance of the subset of DSL lines.

11 Claims, 5 Drawing Sheets

(51) Int. Cl.
*H04L 12/26* (2006.01)
*H04L 12/28* (2006.01)
*H04W 76/10* (2018.01)
*H04L 12/66* (2006.01)
*H04W 72/04* (2009.01)
*H04W 72/12* (2009.01)
*H04W 88/08* (2009.01)

(52) U.S. Cl.
CPC ...... *H04L 41/0213* (2013.01); *H04L 41/0823* (2013.01); *H04L 41/14* (2013.01); *H04L 41/142* (2013.01); *H04L 41/147* (2013.01); *H04L 43/0882* (2013.01); *H04W 72/0406* (2013.01); *H04W 72/1252* (2013.01); *H04W 76/10* (2018.02); *H04W 88/08* (2013.01)

(56) References Cited

U.S. PATENT DOCUMENTS

| | | |
|---|---|---|
| 10,512,000 B2 | 12/2019 | Murugesan et al. |
| 2002/0174384 A1 | 11/2002 | Graichen et al. |
| 2006/0198430 A1 | 9/2006 | Rhee et al. |
| 2007/0124727 A1 | 5/2007 | Tennyson et al. |
| 2007/0208537 A1 | 9/2007 | Savoor et al. |
| 2008/0219290 A1 | 9/2008 | Cioffi et al. |
| 2009/0323903 A1* | 12/2009 | Cioffi .................. H04B 1/1027 379/32.01 |
| 2013/0201844 A1 | 8/2013 | Berg et al. |
| 2015/0189075 A1* | 7/2015 | Hwang ................. H04B 3/46 379/1.03 |
| 2016/0087864 A1* | 3/2016 | Kerpez ................. H04L 1/20 370/242 |

FOREIGN PATENT DOCUMENTS

| | | |
|---|---|---|
| WO | 0205529 A1 | 1/2002 |
| WO | 2013165429 A1 | 5/2012 |
| WO | 2014077850 A1 | 5/2014 |
| WO | 2016089414 A1 | 6/2016 |

OTHER PUBLICATIONS

Nokia User Manual EP 25 Alcatel-Lucent 5530 Network Analyzer-Copper, Release 8.2 User Guide, Sep. 2013 (20 pgs).
Nokia User Manual EP 25 Alcatel-Lucent 5530 Network Analyzer-Copper, Release 8.2 User Guide, Sep. 2013 (4 pgs).
Alcatel-Lucent 5530 Network Analyzer-Copper, Release 8.2 User Guide, 3JB-00093-AAAA-PCZAA Edition 03, Chapters 25 & 26, Sep. 2013, (25 pgs).
Office Action No. 2 dated Jun. 4, 2020 in related Chinese Patent Application No. 201480083855.3, (6 pgs).
Supplementary European search report dated Apr. 3, 2018 in European Application No. EP 14 90 7600, (7 pgs).
Notification of the First Office Action dated Dec. 31, 2019 in the Chines Application No. 201480083855.3, (11 pgs).
International search report and written opinion dated Aug. 21, 2015, in the PCT Application No. PCT/US2014/068666, (16 pgs).
Extended European Search Report dated Feb. 2, 2021 in related European Patent Application No. 20194697.7, (7 pgs).

* cited by examiner

METHOD AND APPARATUS FOR PREDICTING SUCCESSFUL DSL LINE OPTIMIZATION

CROSS-REFERENCE TO RELATED APPLICATIONS

The present application is a divisional of and claims priority benefit, under 35 U.S.C. § 120, to co-pending and commonly-assigned U.S. patent application Ser. No. 15/532,976, entitled "Method and Apparatus for Predicting Successful DSL Line Optimization," naming Sugumar Murugesan and Mehdi Mohseni as inventors, filed on Aug. 10, 2017, which is a 371 National Stage of International Patent Application No. PCT/US2014/068666, entitled "Method and Apparatus for Predicting Successful DSL Line Optimization," naming Sugumar Murugesan and Mehdi Mohseni as inventors, and filed Dec. 4, 2014, which application is hereby incorporated herein by reference in its entirety.

TECHNICAL FIELD

Embodiments of the present disclosure relates to predicting success of optimization of a DSL line.

BACKGROUND

DSL line optimization is a sophisticated process that involves tuning various physical layer configurations, such as data transmission rate, noise protection, operating margin, etc., possibly over multiple closed-loop iterations. Uncertainties in the outcome of this process arise from the presence of hard-to-predict impulse noise in the channel and the fact that each DSL line can exhibit unique underlying characteristics, such as interference, attenuation, etc. Despite these challenges, it is crucial to predict the outcome of DSL optimization so that, for example, appropriate resources can be efficiently allocated in the DSL network. For instance, a line whose performance improvement post-optimization is predicted to be significantly better than that of another line could be given higher priority in sending to a DSL optimizer to optimize, for example, if there is a limit on how many lines can be optimized at a, or over a particular period of, time.

Prior art predictions for DSL optimization performance is limited to capturing simple, plain, or absolute, conditions, such as when system-level limits are violated (e.g., if desired post-optimization rate is above the channel capacity), or when the desired direction of optimization is not viable (e.g., if a DSL line is unstable and desired post-optimization rate is above current transmission rate, since it is deemed impossible to improve both rate and stability at the same time). In summary, prior art attempts at predicting DSL optimization performance may be more accurate in capturing low probability, edge-of-the-spectrum events, than in providing comprehensive performance quantification of the DSL optimizer for more common "middle-of-the-spectrum" events.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Embodiments of the present disclosure are primarily targeted for use with wireline broadband communication systems, but are also applicable to wireless communication and general stochastic systems. This includes Passive Optical Networks (PON), point-to-point fiber broadband, active Ethernet broadband, cable broadband using Data Over Cable Service Interface Specifications (DOCSIS); and Digital Subscriber Lines (DSL).

As used herein, the term "DSL" refers to any of a variety and/or variant of DSL technology such as, for example, Asymmetric DSL (ADSL), ADSL2, ADSL2plus, High-speed DSL (HDSL), HDSL2, Symmetric DSL (SDSL), SHDSL, Very high-speed/Very high-bit-rate DSL (VDSL), VDSL2, vectored VDSL2, and/or G.fast. Such DSL technologies are commonly implemented in accordance with an applicable standard such as, for example, the International Telecommunications Union (I.T.U.) standard G.992.1 (a.k.a. G.dmt) for ADSL modems, the I.T.U. standard G.992.3 (a.k.a. G.dmt.bis, or G.adsl2) for ADSL2 modems, I.T.U. standard G.992.5 (a.k.a. G.adsl2plus) for ADSL2+ modems, I.T.U. standard G.993.1 (a.k.a. G.vdsl) for VDSL modems, I.T.U. standard G.993.2 for VDSL2 modems, I.T.U. standard G.993.5 for DSL modems supporting Vectoring, I.T.U. standard G.998.4 for DSL modems supporting retransmission, I.T.U. standard G.994.1 (G.hs) for modems implementing handshake, and/or the I.T.U. G.997.1 (a.k.a. G.ploam) standard for management of DSL modems. The G.997.1 standard specifies the physical layer management for ADSL transmission systems based on the clear, Embedded Operation Channel (EOC) defined in G.997.1 and use of indicator bits and EOC messages defined in the G.992.x, G.993.x and G.998.4 standards. Moreover, G.997.1 specifies network management elements content for configuration, fault and performance management. In performing the disclosed functions, systems may utilize a variety of operational data (which includes performance data) that is available at an Access Node (AN).

Figure 1:
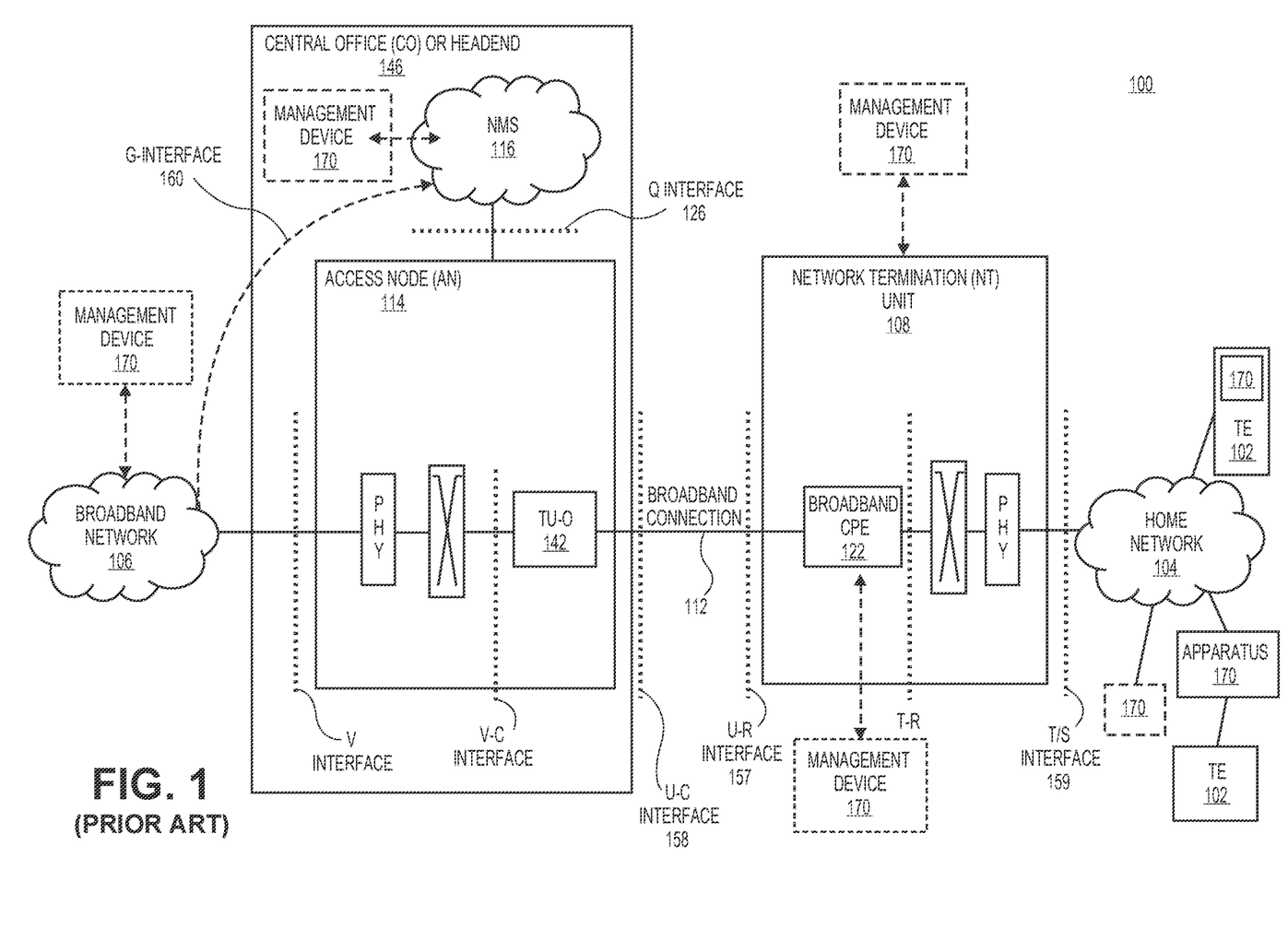
FIG. 1 illustrates an exemplary architecture in which embodiments may operate.

FIG. 1 illustrates an exemplary architecture 100 in which embodiments may operate in compliance with the foregoing standards. In FIG. 1, a user's terminal equipment 102 (e.g., a Customer Premises Equipment (CPE) device or a computer, network node, LAN device, etc.) is coupled to a home network 104, which in turn is coupled to a Network Termination (NT) Unit 108. Multiple termination unit (TU) devices may be deployed. A termination unit provides modulation for a broadband connection, loop or line. In one embodiment, NT unit 108 includes a Termination unit-receiving (TU-R) device (e.g., broadband CPE, modem or gateway) 122.

In one embodiment, broadband CPE 122 collects and stores, among other things, performance and/or operational data in its Management Information Base (MIB), which is a database of information capable of being accessed via network management protocols, such as Simple Network Management Protocol (SNMP), an administration protocol used to gather information from a network device to provide to an administrator console/program; via Transaction Language 1 (TL1) commands, TL1 being a long-established command language used to program responses and commands between telecommunication network elements; via embedded operations channel (eoc) signaling over a DSL line, via a TR-69 based protocol; via ITU-T G.984.4 and G.988 ONU management and control interface (OMCI) signaling; via DOCSIS management signaling; via the Open Cable Application Platform (OCAP); via Ethernet OAM signaling; via extended OAM for Ethernet PON (EPON) using SIEPON; via web-services interfaces; via a web-browser interface; or, via a command line interface (CLI). "TR-69" or "Technical Report 069" is in reference to a DSL Forum technical specification entitled CPE WAN Management Protocol (CWMP) that defines an application layer protocol for remote management of end-user devices. XML or "eXtended Markup Language" compliant programming and interface tools may also be used. In another embodiment, any one or more of management devices 170 collects and stores the performance and/or operational data in a Management Information Base (MIB) direct accessible to the management device 170, or accessible via any one or more of Network Termination unit 108, network management station (NMS) 116, broadband network 106, and home network 104.

In one embodiment, Network Termination Unit 108 is communicably interfaced with a management device 170 as described herein. In another embodiment, modem or gateway 122 is communicably interfaced with management device 170. Each modem 122 in a system may be coupled with a transmission unit (TU-O) 142 in a Central Office (CO), headend, or other central location 146. The TU-O 142 is located at an Access Node (AN) 114 in Central Office or headend 146. A management device 170 likewise maintains an MIB of performance and/or operational data pertaining to TU-O 142. The Access Node 114 may be coupled to a broadband network 106 or other wide-area network (WAN), as will be appreciated by those skilled in the art. Each of modem 122 and TU-O 142 are coupled together by a broadband connection 112, which in the case of DSL may be a twisted pair line, such as a telephone line, which may carry other communication services besides DSL based communications. The broadband connection may also be a point-to-point fiber, a passive optical network (PON), a cable TV network, a hybrid fiber-coax (HFC) network, a fixed wireless network, or a power-line carrier (PLC) network.

Management device 170 may be managed or operated by a service provider of the broadband services or may be operated by a third party, separate from the entity which provides broadband services to end-users. Thus, in accordance with one embodiment apparatus 170 is operated and managed by an entity that is separate and distinct from a telecommunications operator responsible for a plurality of digital communication lines.

Several of the interfaces shown in FIG. 1 are used for determining and collecting performance and/or operational data. The Q interface 126 provides the interface between the Network Management System (NMS) 116 of the operator and Access Node 114.

Depicted within FIG. 1 is management device 170 operating at various optional locations in accordance with several alternative embodiments. For example, management device 170 is located at central office or headend 146 and interfaced to home network 104 (e.g., a LAN) and broadband network 106 (e.g., WAN). In another embodiment, management device 170 operates on the broadband network 106 (e.g., on the WAN). In yet another embodiment, apparatus 170 operates as a remote server, servers, or cloud computing infrastructure.

As used herein, the terms "user," "subscriber," and/or "customer" refer to a person, business and/or organization to which communication services and/or equipment are and/or may potentially be provided by any of a variety of service provider(s). Further, the term "customer premises" refers to the location to which communication services are being provided by a service provider. Example customer premises include a residence or an office building. As used herein, the term "service provider" refers to any of a variety of entities that provide, sell, provision, troubleshoot and/or maintain communication services and/or communication equipment. Example service providers include a telephone operating company, a cable operating company, a wireless operating company, an Internet service provider, a competitive operator, or any service that may independently or in conjunction with a broadband communications service provider offer services that diagnose or improve broadband communications services (DSL, DSL services, cable, fiber, etc.).

Figure 2:
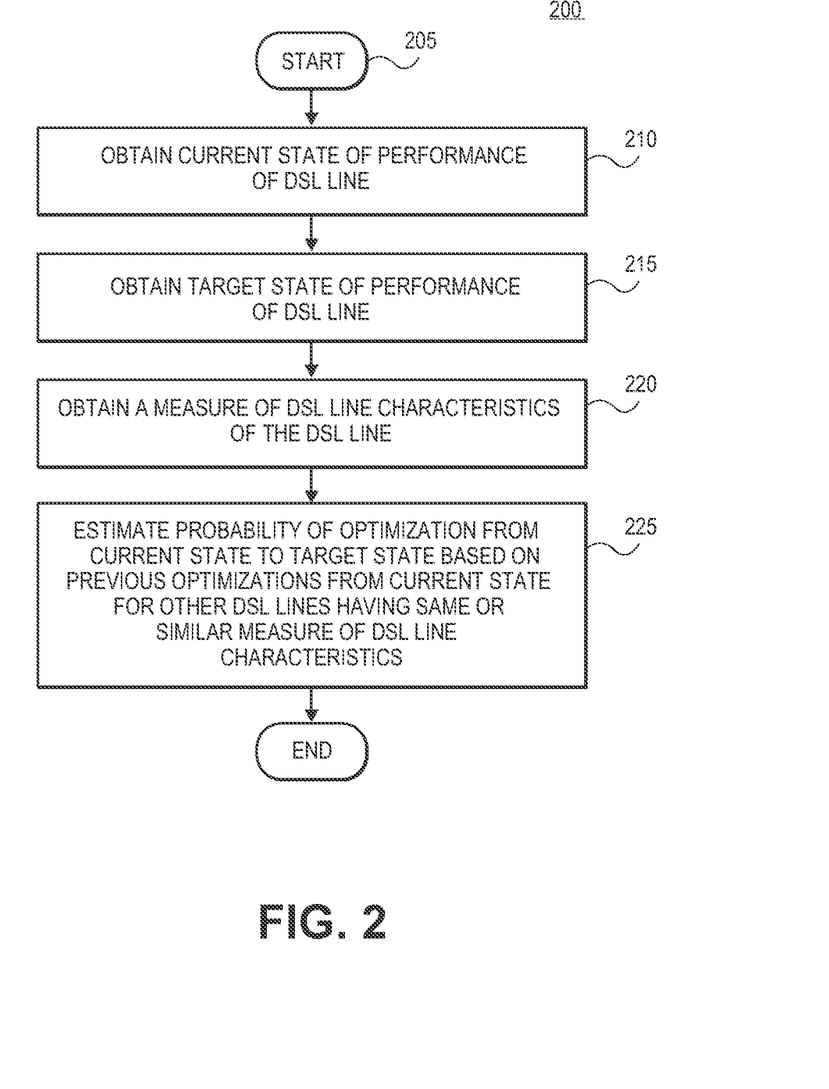
FIG. 2 is a flow chart of an embodiment of the present disclosure.

In one embodiment of the present disclosure, a DSL management system, such as any of the aforementioned management devices 170, or a DSL controller located in, or operating and communicating in conjunction with, any one of management devices 170, predicts achieving improved performance of a DSL line 112, before a DSL optimizer actually attempts to optimize the performance of the DSL line. The DSL controller, and/or the DSL optimizer, in embodiments of the present disclosure, may be located in, or operating in conjunction with, any one of the management devices 170, CO 146, AN 114, TU-O 142, NT 108, or CPE 122. With reference to FIG. 2, in one embodiment 200, the DSL management system starts the process at 205 by obtaining at 210 a current state of performance of the DSL line 112, before optimization, and further obtaining at 215, a desired, or target, state of performance of the DSL line after optimization.

In addition to receiving a current and target state of performance for a DSL line, the DSL management system also obtains at 220 a measure of DSL line characteristics of the DSL line. In one embodiment, the DSL line characteristics that are measured are the data transmission capacity of the DSL line, and the current rate of utilization of the capacity of the DSL line. Once the measure is obtained, the DSL management system identifies, from among a store of records of information associated with optimizing performance of a number of DSL lines, a particular group or subset of the records of performance information correspondingly associated with a group or subset of the number of DSL lines that have a similar measure of DSL line characteristics as the DSL line for which achieving improved performance is to be predicted. For example, in one embodiment, the records may be stored in the MIB into which broadband CPE 122 collects and stores, among other things, performance and/or operational data. In alternative embodiments, the records are stored in a permanent (non-volatile memory) store coupled to, or in communication with, a management device 170, or other device accessible to a management device, such as CO 146, AN 114, TU-O 142, NT 108, broadband network 106 and home network 104. The group of records are identified by searching all the records to find the group or subset of records relating to a number of DSL lines that have a similar measure of DSL line characteristics as the DSL line for which achieving improved performance is to be predicted.

In one embodiment, the measure of the DSL line characteristics of the DSL line is a measure of the data transmission capacity, and a measure of a current utilization of the data transmission capacity, of the DSL line. In one embodiment, the capacity of the DSL line is defined, or represented, as one or more of: a maximum achievable bit rate (MABR), a DSL line loop length, and a DSL line attenuation. In one embodiment, the current utilization of the DSL line is defined, or represented, as one or both of a ratio of a current synch rate (SYNC) to MABR, and a current operating margin of the DSL line.

The management system obtains at 225 a probability that the DSL optimizer will optimize the performance of the DSL line, optimizing it from the current state of performance to the target state of performance, based on a statistical analysis of the identified subset of records of performance information associated with the identified subset of DSL lines that detect the instances when the DSL optimizer previously has optimized the performance of the subset of DSL lines from a same or similar state as the current state of performance to a same or similar state as the target state of performance. For example, the management system may, in one embodiment of the present disclosure, perform statistical analysis on a subset of records of information associated with the identified subset of DSL lines that detects the instances when the DSL optimizer previously has optimized the performance of the subset of DSL lines from a range of current states of performance that encompass or that is near to the same state as the current state to a range of target states of performance that encompass or that is near to the same state as the target state of performance.

It is contemplated that a variety of applications may take advantage of embodiments of the present disclosure. For example, once the probability of optimization has been estimated at 225, a DSL management system may prioritize optimization of the DSL line relative to another DSL line, based on the obtained probability that the DSL optimizer will optimize the performance of the DSL line from the current state of performance to the target state of performance. The other DSL line need not be comparable in any fixed way (whether in terms of capacity, current utilization rate, current state, or target state) to the DSL line under consideration. Indeed, the target state of the other DSL line can be different. For instance, one may only be interested in comparing the probability of success in improving the state of a DSL line by a delta rate (delta=target utilization rate—current utilization rate) and maintaining the DSL line as stable. In other use-cases, the success probability may be compared for DSL lines with comparable capacity or current utilization, or with comparable current state, or with comparable target state, or any combination of above.

Another application involves allocating DSL system resources according to the obtained probability that the DSL optimizer will optimize the performance of the DSL line from the current state of performance to the target state of performance. Yet another application relates to providing output recommending a service product for the DSL line according to the obtained probability that the DSL optimizer will optimize the performance of the DSL line from the current state of performance to the target state of performance. As an example, given a service product, defined by a minimum and maximum data transmission rate supported by an internet service provider, if an embodiment determines the probability of improving the DSL line state from the current state to the target state within the customer's service product limits is very low, the DSL system may recommend downgrading the service product to one with lower minimum data transmission rate. Alternatively, the DSL management system may recommend upgrading to a higher service product based on the success probability for a very good target state.

As noted above, the management system obtains at 225 a probability that the DSL optimizer will optimize the performance of the DSL line, optimizing it from the current state of performance to the target state of performance, based on a statistical analysis of the identified subset of records of performance information associated with the identified subset of DSL lines that detects the instances when the DSL optimizer previously has optimized the performance of the subset of DSL lines from a same or similar state as the current state of performance to a same or similar state as the target state of performance. In one embodiment, this is accomplished by calculating the frequency with which the identified subset of records of performance information associated with the identified subset of DSL lines indicates that the DSL optimizer previously has optimized the performance of the subset of DSL lines from a same or similar state as the current state of performance to a same or similar state as the target state of performance.

Regarding the current state of performance of the DSL line, in one embodiment, the current state is defined, or represented, as a current data transmission rate for the DSL line and as a current state of stability for the DSL line, wherein the current state of stability is either a stable state or an unstable state. In one embodiment, a stable state exists when DSL line code violations and retrains are within set thresholds for the DSL line and an unstable state exists when DSL line code violations or retrains are outside thresholds set for the DSL line.

Regarding the target state of performance of the DSL line, the target state of performance of the DSL line is defined, or represented, as a target data transmission rate for the DSL line and as a target state of stability of the DSL line, wherein the target state of stability is either a stable state or an unstable state, as defined above.

Figure 3:
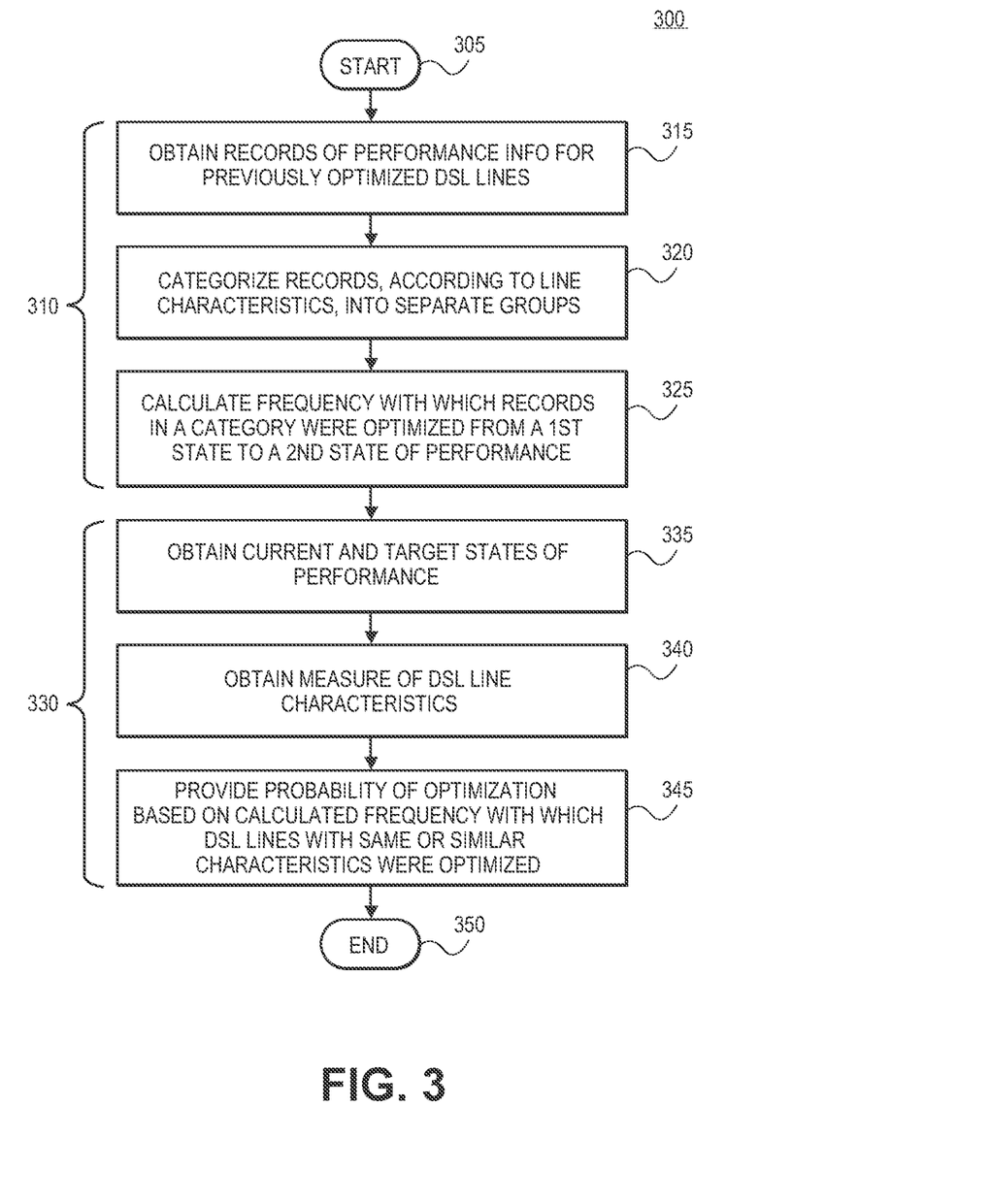
FIG. 3 is a flow chart of an embodiment of the present disclosure.

With reference to FIG. 3, another embodiment of the present disclosure 300 involves a DSL management system predicting achieving improved performance of a DSL line, before a DSL optimizer in the DSL management system actually optimizes performance of the DSL line. The process starts at 305 with an algorithm-training phase 310, by first obtaining at 315 records of, for example, performance-related, information associated with optimizing performance of DSL lines. In one embodiment, each record provides a measure of DSL line characteristics before optimization for one of the DSL lines, as well as a first state of performance before optimization for the DSL line, and a second state of performance after optimization of the DSL line. The records are categorized at 320 into one of a number of separate categories according to the measure of DSL line characteristics provided in each record. In one embodiment, each of the categories is defined by a non-overlapping range of the measure of DSL line characteristics indicated in the records.

In one embodiment, categorizing each of the records into a separate category according to the measure of DSL line characteristics involves selecting a measure of DSL line characteristics by which to categorize each of records so that the DSL lines that are associated with records in a particular category are expected to have similar underlying channel characteristics. At 325, the last step of the algorithm-training phase, the embodiment calculates, for each category of records, a frequency with which the records in the category indicate the associated DSL lines were optimized from a first state of performance to a second state of performance. In one embodiment, the calculation of the frequency with which the records in the category were optimized from the first state of performance to the second state of performance is performed for any value or range or values for the first state and the second state. In one embodiment, these calculations are used as the basis for creating a lookup table of the probabilities for any possible first and second states for each category.

The embodiment next contemplates a successful optimization prediction phase 330, in which, as a first step, a current state of performance of a DSL line before optimization, and a target state of performance of the DSL line after optimization, is obtained at 335. The embodiment further obtains a measure of the DSL line characteristics of the DSL line at 340, and searches at 345 the records compiled in the algorithm-training phase to identify one of the categories of records having the range of measures of DSL line characteristics that encompass or is most similar to the obtained measure of DSL line characteristics of the DSL line, and, within such category of records, determine the probability that the DSL optimizer will optimize the performance of the DSL line from the current state of performance to the target state of performance, based on the calculated frequency with which the records in the identified category indicate the associated DSL lines were optimized from a first state of performance similar to the current state of performance to a second state of performance similar to the target state of performance.

As with the other embodiment described herein, the embodiment described with reference to FIG. 3 may also support a number of applications such as a DSL management system prioritizing optimization of the DSL line relative to another DSL line, based on the obtained probability that the DSL optimizer will optimize the performance of the DSL line from the current state of performance to the target state of performance, or allocating DSL system resources according to the obtained probability that the DSL optimizer will optimize the performance of the DSL line from the current state of performance to the target state of performance, or providing output recommending a service product for the DSL line according to the obtained probability that the DSL optimizer will optimize the performance of the DSL line from the current state of performance to the target state of performance.

So too, the current state of performance of the DSL line, in this embodiment, is defined as a current data transmission rate for the DSL line and as a current state of stability for the DSL line, wherein the current state of stability is either a stable state or an unstable state, and the target state of performance of the DSL line is defined as a target data transmission rate for the DSL line and as a target state of stability of the DSL line, wherein the target state of stability is either a stable state or an unstable state.

Figure 4:
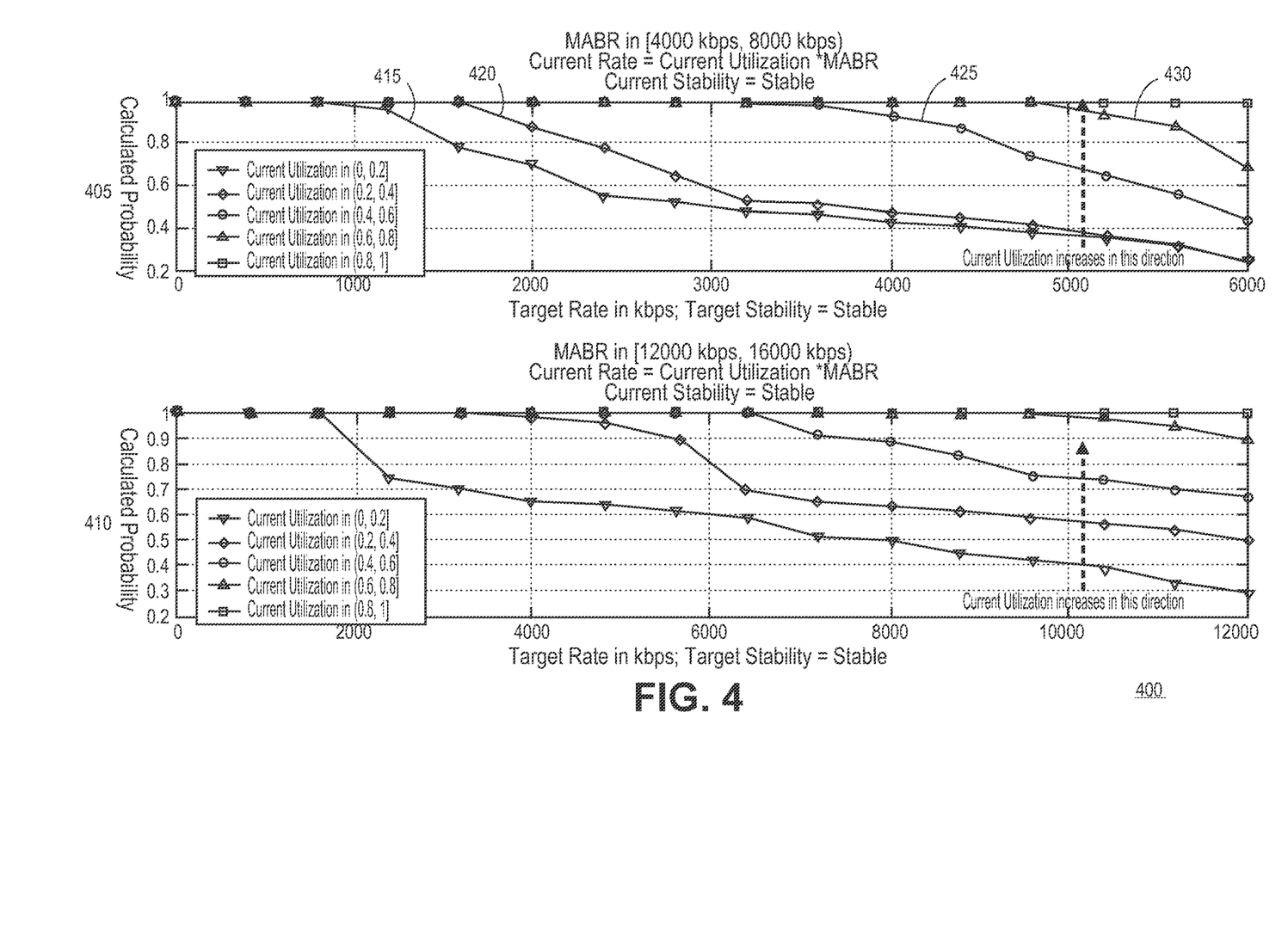
FIG. 4 is a diagram of the probability of successful optimization of a DSL line versus current state of performance/target state of performance for various measures of DSL characteristics according to embodiments of the present disclosure.

With reference to the empirical data graphed in FIG. 4 and gathered during testing of embodiments of the present disclosure 400, in the algorithm training phase 310, sufficient number of data points were gathered for the DSL line state of performance before and after DSL optimizations were performed. With this data, the success predictor phase 330 was able to calculate the probability with which the post-optimization DSL line state achieved a target state of performance. The measure of DSL line characteristics of the DSL line that were selected in testing one embodiment of the present disclosure was capacity of the DSL line, and the current rate of utilization of the capacity of the DSL line. In DSL terminology, capacity of the DSL line is referred to as MABR (maximum achievable bit rate). Embodiments of the present disclosure measure current utilization (Uc) as SYNCH/MABR where SYNCH is the current synch rate. The choice of (MABR, Uc) in one embodiment of the present disclosure derives from the fact that MABR indicates the capacity of the DSL line as characterized by signal attenuation and stationary noise on the DSL line. Thus, DSL lines with similar underlying stationary statistics are grouped together in the same category at 320.

Uc indicates the degree of the capacity of the DSL line that is being utilized. A motivation for choosing Uc can be illustrated via an example: if DSL lines 1 and 2 have the same capacity and same state of stability but line 2 has a lower utilization rate, one can expect that line 2 is facing more severe non-stationary noise impairments such as impulse noise on the line. In other words, despite relatively under-utilizing the line, due to the presence of more serious noise impairments, line 2 is displaying the same stability behavior as line 1. Thus, on an average, line 2 will have a lower likelihood of success in achieving a target state of performance after optimization.

FIG. 4 graphically illustrates monotonically decreasing success probabilities for monotonically decreasing Uc, empirically validating use of (MABR, Uc) as the measure of DSL line characteristics, in one embodiment of the present disclosure. With reference to the flowchart in FIG. 3, during success prediction stage 330, for a considered DSL line, the appropriate category of DSL lines from which to obtain the measure of characteristics at 340 is identified based on the values for MABR and Uc. For a given target stable state and desired target rate (Ut), success probability is retrieved from the calculations made at 325 during algorithm training phase 310. This success probability can, in turn, be used in various DSL components to efficiently allocate network resources.

FIG. 4 contains two graphs 405 and 410. The DSL lines considered in both graphs have a starting stability state=stable. (Recall that current state comprises both starting stability and current rate in one embodiment). Graph 405 corresponds to lines with MABR in the (4000, 8000) kbps range (recall the DSL measure comprises both MABR and current utilization in one embodiment). The horizontal axis corresponds to a target rate (recall target state is made of target rate and target stability). Target stability=stable is considered. The vertical axis in both graphs is the calculated probability that a DSL optimizer achieves a target state in the horizontal axis. Each plot in graph 405 is defined by a current utilization. For instance, plot 415 provides a calculated probability, among lines with current MABR in [4000, 8000 kbps) and current utilization in (0, 0.2], that the DSL optimizer achieves the corresponding target state on the horizontal axis, when current stability state is stable and current rate=current utilization multiplied by MABR (recall current utilization=current synch rate/MABR). Likewise, plots 420, 425 and 430 provides a calculated probability, among lines with various ranges of MABR and current utilization, that the DSL optimizer achieves the corresponding target state on the horizontal axis, when current stability state is stable and current rate=current utilization multiplied by MABR.

Importantly, (1) within a range of MABR as graphed in 405 and 410, for a given target state, as current utilization increases, the probability of achieving the target state also increases, and (2) when the range of MABR changes (graph 405 to graph 410), the probabilities change. While (1) above supports embodiments of the present disclosure described above, (1) and (2) combined also validates the choice of DSL measures (MABR, current utilization) described herein and in general the need to group lines based on DSL measures.

Figure 5:
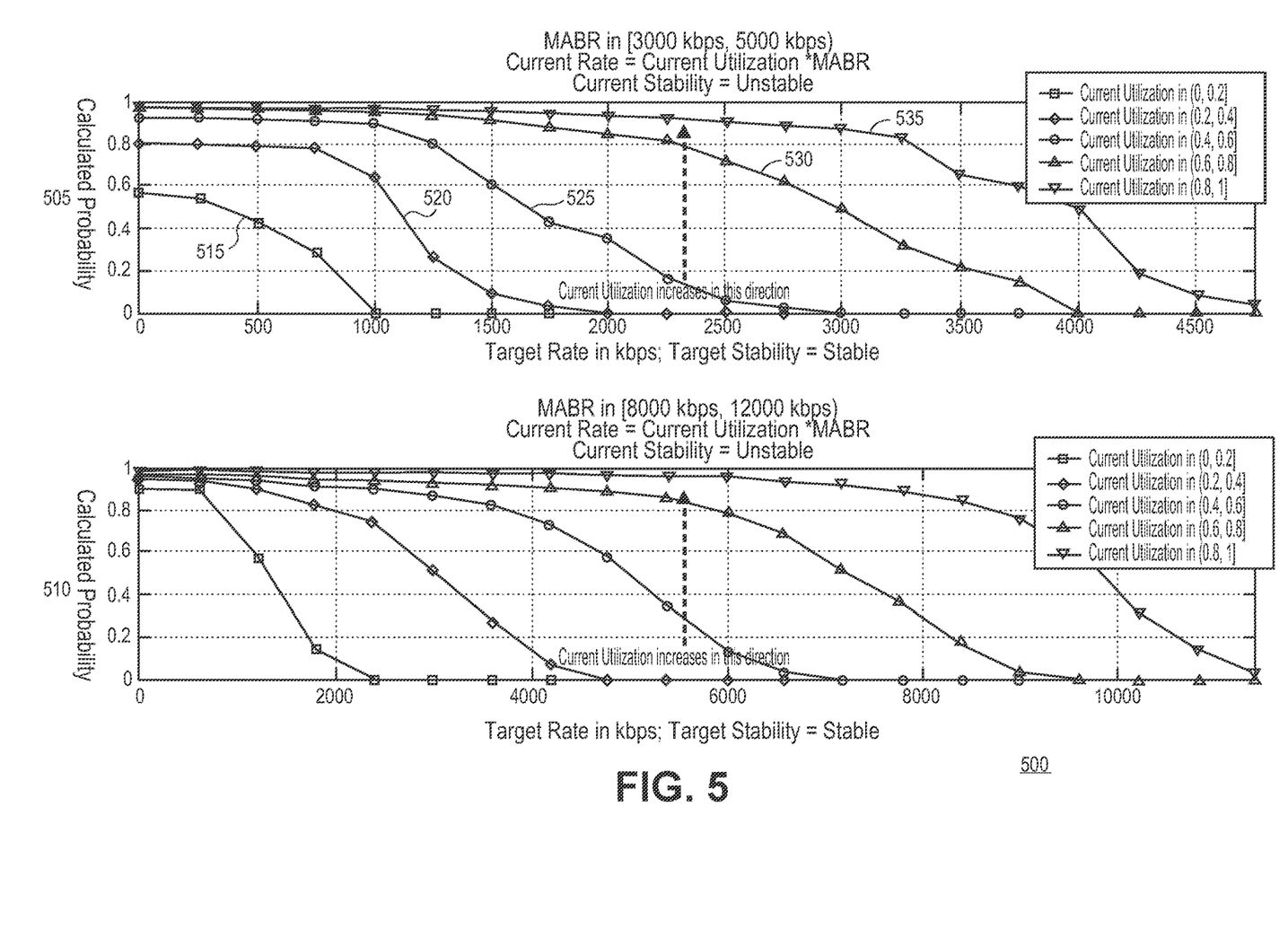
FIG. 5 is a diagram of the probability of successful optimization of a DSL line versus current state of performance/target state of performance for various measures of DSL characteristics according to embodiments of the present disclosure.

FIG. 5 graphically illustrates at 500 monotonically decreasing success probabilities for monotonically decreasing Uc, empirically validating use of (MABR, Uc) as the measure of DSL line characteristics, in one embodiment of the present disclosure. In particular, FIG. 5 contains two graphs 505 and 510. The DSL lines considered in both graphs have a starting stability state=unstable. Graph 505 corresponds to lines with MABR in the [3000,5000) kbps range. The horizontal axis corresponds to a target rate. Target stability=stable is considered. The vertical axis in both graphs 505 and 510 is the calculated probability that a DSL optimizer achieves a target state in the horizontal axis. Each plot in graph 505 is defined by a current utilization. For instance, plot 515 provides a calculated probability, among lines with current MABR in [3000, 5000 kbps) and current utilization in (0, 0.2], that the DSL optimizer achieves the corresponding target state on the horizontal axis, when current stability state is stable and current rate=current utilization multiplied by MABR (recall current utilization=current rate/MABR) Likewise, plots 520, 525, 530 and 535 provide a calculated probability, among lines with various ranges of MABR and current utilization, that the DSL optimizer achieves the corresponding target state on the horizontal axis, when current stability state is unstable and current rate=current utilization multiplied by MABR. Within a range of MABR as graphed in 505 and 510, for a given target state, as current utilization increases, the probability of achieving the target state also increases, and when the range of MABR changes (graph 505 to graph 510), the probabilities likewise change.

The DSL management system, or the DSL controller, may be a general purpose or special purpose computer system, in accordance with the embodiments described herein, within which a set of instructions, for causing the aforesaid devices to perform any one or more of the methodologies discussed herein, may be executed. In alternative embodiments, these devices may be connected, networked, interfaced, etc., with other machines in a Local Area Network (LAN), a Wide Area Network, an intranet, an extranet, or the Internet. One or more of the devices may operate in the capacity of a server or a client in a client-server network environment, or as a peer in a peer-to-peer (or distributed) network environment. In certain embodiments, each of the devices may be in the form of a personal computer (PC), a tablet PC, a set-top box (STB), a Personal Digital Assistant (PDA), a cellular telephone, a web appliance, a server, a network router, switch or bridge, computing system, Internet enabled television, or any machine capable of executing a set of instructions (sequential or otherwise) that specify actions to be taken by that machine. Further, where only a single machine is illustrated, the term "machine" shall also be taken to include any collection of machines (e.g., computers) that individually or jointly execute a set (or multiple sets) of instructions to perform any one or more of the methodologies discussed herein.

One or more of the devices may include a non-transitory machine-readable storage medium (or more specifically a non-transitory machine-accessible storage medium) on which is stored one or more sets of instructions (e.g., software) embodying any one or more of the methodologies or functions described herein. Software may also reside, or alternatively reside within a main memory of a device, and may further reside completely or at least partially within a processor(s) during execution thereof by a computing system, the main memory and the processor(s) also constituting machine-readable storage media. The software may further be transmitted or received over a network via a network interface card.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method of predicting improved performance of a digital subscriber line (DSL) line before a DSL optimizer in the DSL management system optimizes performance of the DSL line, the method comprising: obtaining from a DSL controller: a current state of performance of the DSL line before optimization; a target state of performance of the DSL line after optimization; and a measure of DSL line characteristics of the DSL line; identifying, from among a plurality of records associated with optimizing performance of a plurality of DSL lines, a subset of the records associated with optimizing performance of a subset of DSL lines having a similar measure of DSL line characteristics as the DSL line for which improved performance is to be predicted; obtaining a probability that the DSL optimizer will optimize the performance of the DSL line from the current state of performance to the target state of performance, based on a statistical analysis of the identified subset of records associated with optimizing performance of the subset of DSL lines that detects instances when the DSL optimizer previously has optimized the performance of the subset of DSL lines from a same or similar state as the current state of performance to a same or similar state as the target state of performance; and using the obtained probability to allocate DSL system resources in a DSL network.

2. The method of claim 1, further comprising prioritizing optimization of the DSL line relative to another DSL line based on the obtained probability that the DSL optimizer will optimize the performance of the DSL line from the current state of performance to the target state of performance.

3. The method of claim 1, further comprising allocating DSL system resources according to the obtained probability that the DSL optimizer will optimize the performance of the DSL line from the current state of performance to the target state of performance.

4. The method of claim 1, further comprising recommending a service product for the DSL line according to the obtained probability that the DSL optimizer will optimize the performance of the DSL line from the current state of performance to the target state of performance.

5. The method of claim 1, wherein obtaining, based on statistical analysis, the probability that the DSL optimizer will optimize the performance of the DSL line from the current state of performance to the target state of performance comprises calculating a frequency with which the identified subset of records associated with optimizing performance of the subset of DSL lines indicates that the DSL optimizer previously has optimized the performance of the subset of DSL lines from a same or similar state as the current state of performance to a same or similar state as the target state of performance.

6. The method of claim 1, wherein identifying, from among a plurality of records associated with optimizing performance of a plurality of DSL lines, a subset of the records associated with optimizing performance of a subset of DSL lines having a similar measure of DSL line characteristics as the DSL line for which improved DSL line performance is to be predicted comprises searching a memory store accessible to the DSL management system that contains the plurality of records associated with optimizing performance of the plurality of DSL lines for the subset of records associated with optimizing performance of the subset of DSL lines having the similar measure of DSL line characteristics as the DSL line.

7. The method of claim 1, wherein the current state of performance of the DSL line is defined, or represented, as a current data transmission rate for the DSL line and as a current state of stability for the DSL line, wherein the current state of stability is either a stable state or an unstable state.

8. The method of claim 1, wherein the target state of performance of the DSL line is defined, or represented, as a target data transmission rate for the DSL line and as a target state of stability of the DSL line, wherein the target state of stability is either a stable state or an unstable state.

9. The method of claim 1 wherein the measure of the DSL line characteristics of the DSL line comprises a capacity, and a current utilization, of the DSL line.

10. The method of claim 9, wherein the capacity of the DSL line is defined, or represented, as one or more of: a maximum achievable bit rate (MABR), a DSL line loop length, or a DSL line attenuation.

11. The method of claim 9, wherein the current utilization of the DSL line is defined, or represented, as one or both of: a ratio of a current synch rate (SYNC) to MABR, or a current operating margin of the DSL line.

* * * * *